United States Patent [19]
Hobelsberger

[11] Patent Number: 5,265,439
[45] Date of Patent: Nov. 30, 1993

[54] METHOD AND DEVICE FOR THE MANUFACTURE OF ICE FIGURES

[76] Inventor: Josef Hobelsberger, Fritz Reuter St 9, D-2117 Tostadt, Fed. Rep. of Germany

[21] Appl. No.: 761,814
[22] PCT Filed: Mar. 21, 1990
[86] PCT No.: PCT/DE90/00222
  § 371 Date: Sep. 20, 1991
  § 102(e) Date: Sep. 20, 1991
[87] PCT Pub. No.: WO90/11479
  PCT Pub. Date: Oct. 4, 1990

[30] Foreign Application Priority Data
Mar. 21, 1989 [DE] Fed. Rep. of Germany ....... 3909316
May 3, 1989 [DE] Fed. Rep. of Germany ....... 3914655

[51] Int. Cl.$^5$ ............................................. F25C 1/04
[52] U.S. Cl. .......................................... 62/356; 62/73; 249/55
[58] Field of Search ............ 62/243, 73, 75, 66, 62/356; 156/80; 264/28, 248; 249/55

[56] References Cited
U.S. PATENT DOCUMENTS

| | | | |
|---|---|---|---|
| 1,965,616 | 7/1934 | Vogt | 62/66 |
| 3,576,113 | 4/1971 | Swett et al. | 62/75 X |
| 3,731,103 | 3/1973 | Brandt et al. | 62/73 |
| 4,550,575 | 11/1985 | DeGaynor | 62/356 X |

Primary Examiner—John C. Fox
Attorney, Agent, or Firm—Omri M. Behr; Matthew J. McDonald

[57] ABSTRACT

The invention relates to a process for producing ice figures as well as a device for this purpose. A device in accordance with invention (901) is provided with at least two cooling bodies (905, 906) facing one another, and these are washed by water inside a container (902). The cooling bodies are cooled to below the freezing point of water by means of a refrigeration compressor (904) using coolant so that ice layers (918, 919) form on each cooling body (905, 906), and grow onto one another and then contact one another, so that the two ice layers freeze together, so that a single-piece ice figure is produced, where the completion of the single-piece ice figure is detected for example with a sensor (922). Once the single-piece ice figure is completed it is detached from the cooling bodies (905, 906) and removed. By means of the detection of completion of the single-piece ice figure the whole process can be automated so that a process and also a device for serial production of single-piece ice figures in large runs is made available.

11 Claims, 8 Drawing Sheets

METHOD AND DEVICE FOR THE MANUFACTURE OF ICE FIGURES

The invention is a method for the manufacture of ice figures according to the characterizing clauses of the claims 1 and 6 as well as a respective device according to the characterizing clauses 13 and 14.

Ice figures are cast for special gastronomic occasions and events such as cold buffets, receptions and banquets as decorative element, often in connection with floral arrangements and special lighting effects. Animals or human figures are frequent motifs, while other elements such as letters or numbers relating to dates of festive occasions are frequently cast out of ice. The size of the ice figures ranges from a few centimeters to several meters. The surface of the figures usually displays a detailed structuring, such as a human face or the representation of feathers in the case of a bird figure.

One of the conventional ways of manufacturing ice figures consists of chiselling a figure of the desired size out of a block of ice with the use of a hammer and a chisel. Even in the event of relatively simple figures the amount of time required is anything up to three hours, whereby large and more complicated figures are more time consuming. The ice block chiselling method is beset with another difficulty, however, namely the fact that many cooks and chefs have not undergone the special training required and/or lack the aptitude and skills for creating sculptures. Moreover, there is always the risk that the ice sculptor, who is usually working under time pressure, will produce a figure of inferior esthetic appeal, or that an important part of the figure, or even the entire figure itself, will become damaged or broken due to an accidental misguided blow. Apart from this, the ice chiselling method is a technique for producing individual, single ice figures and is not suitable for series production.

The DE-PS 31 33 617 device enables ice figures to be produced without any of the above mentioned disadvantages. In the respective publication a method of casting ice figures in casting moulds with mostly rigid walls is presented. According to this method the filled casting moulds are placed in a refrigerator section or a refrigerating chamber and chilled to a temperature below the freezing point of water. There is an additional DE-PS 31 33 671 model, however, which introduces a rod shaped refrigeration element to the casting mould so that the freezing process occurs from the direction of the rod towards the walls of the casting mould.

While the method described for the DE-PS 31 33 617 does simplify the manufacture of ice figures compared with the ice chiselling method, it was found that this method incurs problems for the series manufacture of ice figures due to the relatively long refrigeration periods, the relatively large amount of space required and the refrigeration technology involved. This method proved problematic in the production of transparent ice due to the difficulty involved in freezing water from the inside to the outside within a closed mould while keeping the water in motion in order to generate transparent ice. As the mould is closed on all sides, the water, which inevitably contains impurities, will finally be frozen as part of the figure so that opaque sections cannot be avoided. In addition, a strong rise in tension caused by the increasing volume of the ice must be controlled by the introduction of discharging canals.

Based on the state of the art of the DE-PS 31 33 617 the present invention seeks to establish a method as well as a device which will permit the fast and simple manufacture of ice figures of all kinds, if required of transparent ice, and will be suited to series production when required.

In terms of the technical process involved, this task is fulfilled by the essential properties of claims 1 and 6, and in terms of the devices employed by the essential properties of the claims 13 and 14.

As each ice figure must be formed of at least two components, the parallel manufacturing of the components is capable of cutting down the time required to produce a complete ice figure approximately by half, as only half of the figure or an even smaller fraction of the ice figure needs to be formed out of solid ice. Moreover, it is possible, by using an array of preferably concave shaped refrigerating surfaces cooled below the freezing point of water, to shape the components for a number of ice figures at the same time.

By introducing a surplus quantity of water to the refrigerating surfaces, the water solidifies in such a way that the layer of ice forming grows away from the cooling surface. This ensures, for one, that the usual aerosol mist technologies and rotational moulding technologies can be employed which are used in the manufacture of transparent ice bodies as described in the DE-PS 37 21 334 system, for example. On the other hand the fact that the ice layer forming grows away from the cooling surface means that the gases contained in the water, particularly air, are retained during the freezing process at the cooling surface or at the ice layer already formed at the front line of the freezing process, i.e. the interface between ice and air where they are washed out by the extra amount of water so that a transparent, or at least a translucent component of an ice figure is formed. In this manner, the detailed working of the later exterior surface of an ice figure component can be achieved by the design and formation of the cooling surface alone. This allows the formation of ice figure components with surfaces displaying fine engravings, for example.

The problem of ice increasing in volume is solved by the continuous admission of cold water to the cooling surface serving as mould. As a result the volume of water required to form the desired ice volume at the cooling surface no longer plays an important role. As the components are separated from the cooling surface and at least one section of the free surface can be thawed so as to form a flat surface, any irregularities arising through an inhomogenous distribution of the water being introduced to the cooling surface can be compensated so that uniform ice figures—with the surfaces previously on the outside of the components now on the inside—can be formed after joining the thawed surfaces and repeated freezing below the freezing point of water. Should the melted water generated prove insufficient to join the two components it is possible to introduce additional water as adhesion promoting agent to the free surfaces of the two components. The thawing of the two free surfaces can be accomplished with the help of a heated plate. In doing so, it is not necessary to thaw the entire free surface but only an annular zone, for example, in the case of a round free surface.

Should moulded components prove to be too thick, they can easily be reduced to the desired thickness by means of thawing and melting down.

In accordance with the present invention, the process involved would also permit a sliding arrangement of the spraying or rotational moulding device so that the spraying or moulding device employed could be run underneath a series of cooling surface arrangements and introduce water to the cooling surfaces of the arrangements of cooling surfaces until the components of the ice figures in the respective cooling surface arrangement have attained the desired size. After the ice figure components have been formed in one of the cooling surface arrangements the spraying or rotational moulding device comes to a brief halt and is then positioned underneath one of the following cooling surface arrangements. Subsequent to the admission of water by the spraying or rotational moulding device employed the components can be removed from the mould and collected so that they can be manually thawed to form flat surfaces and joined together, thereby allowing the series production of a relatively large number of ice figures. This method is particularly suitable for producing components of different ice figures on a single manufacturing line in one working cycle.

Another possibility of producing ice figures according to claim 1 consists of making use of conventional cooling bodies displaying a convex cooling surface and employing evaporation agents or liquid coolants, preferably on a glycol basis, whereby this process involves dipping the cooling surface into a surplus amount of water. According to the shape and arrangement of the cooling surface, this dipping method is particularly well suited for producing bowl shaped figures and formations.

Ice bowls can be thawed at the opposite end to their opening and joined the other way around and cooled once again so that the two bowl shaped components are joined to form a one-piece, cup or goblet shaped ice figure.

This method offers the special advantage that the use of conventional cooling bodies operating on the basis of evaporating agents or glycols and displaying convex cooling surfaces allow the manufacture of ice figure components which consist alternatively of transparent ice and opaque ice; transparent ice is formed when the surplus water is circulated around the cooling surface being dipped in, while opaque ice is formed when the surplus water into which the cooling surface is dipped remains unmoved.

This affords attractive possibilities for combining transparent ice with opaque ice, for example in the form of a cup or goblet shaped ice figure with a bowl shaped piece of opaque ice serving as a foot, while the upper piece, the actual bowl, consists of transparent ice, if desired with one or several items for encasement, or vice versa. In this context, the combination of more than two components forming a composite ice figure made up of different types of ice is also conceivable.

When employing this method the inner surfaces of the bowl shaped components have the exact same size as the cooling surfaces forming these components.

When required, these ice figure components with a flat surface on one side can be used on their own, to be positioned in front of a candle, for example, as a part of floral arrangements. Such components may also find use as elements of a relief, particularly an ice relief.

The provisions described in claim 2 offer the advantage of forming complex components with the help of a divided cooling surface, for example, such as components with an undercut, which can then be easily removed from the mould thanks to the divided cooling surface.

Another advantage consists of the fact that the two opposing surface elements contacting the cooling surface form a perfect match with the surface elements of the adjoining component.

In forming components with zones of varying thickness the provisions of claim 3 offer the advantage that different refrigerating capacities can be applied to sections with different ice layer thicknesses so as to guarantee an almost even freezing process of components of ice figures with varying thicknesses. This is also provided in the event of an even admission of water.

The provisions of claim 4 offer the advantage that components can be separated from the cooling surface by a brief warming of the cooling surface and removed from the mould, while at the same time, a finer surface structure is created so that a subsequent treatment of the components which were in direct contact with the cooling surface can be dispensed with. In the event that an additional surface treatment be desired, this can be executed by way of the usual chisel method or by using tools similar to soldering irons.

The interruption of the conversion of water into ice according to claim 5 offers the advantage that when water is applied to the surface of the ice layer created until the interruption of the ice formation process, and wetted items for encasement or items for encasement come into contact with the freezing water on the ice layer, such items for encasement can be "attached" to the surface. In this manner it is possible to create actual pictures on the surface of the ice layer without having to resort to the use of additional fixing or mounting elements such as wire, clamps, etc., due to the fact that the adhesive agent is capable of attaching the item for encasement to the surface of the ice by itself. This method is especially suited to attaching thin items for encasement such as photographs to the surface of a component. Afterwards this section with its encased item can be wetted and joined at the free surface with another suitable component without encased item and cooled below freezing point so that a completely encased inclusion is formed inside the ice figure composed of the two components.

Continuing the freezing process has the effect of causing the inclusion element or a number of inclusion elements to continuously coalesce with the ice growing away from the cooling surface in such a way that the appearance of visible ice/ice borderline surfaces can be almost completely averted should this be desired. This procedure also enables the production of a component of an ice figure with one or several inclusions surrounded by homogeneous inclusions. If required, this allows the creation of a transparent, or at least translucent ice figure component, as well as a uniform ice figure after joining of the components, in which the inclusion achieves a maximum optical effect. Here too, it is possible to make the first layer out of opaque ice and the second out of transparent ice.

It is also possible to attach an item for encasement directly to the cooling surface of the cooling body before the ice formation process begins. As a result, the surface of the item to be encased which faces the cooling surface is encased in such a manner that the envelope of the outer surface of the item encased and the envelope of the outer surface of the component initially coincide. As the components of such an ice figure begin to melt, however, the two begin to draw away from each other so that ice figures can be formed which display relief-like encased items. The use of water as an adhesive agent has the advantage of incurring very little cost and effort in routine operations.

A further solution of the aim of the invention is achieved according to claim 6: due to the fact that water is brought into contact with at least two cooling bodies, in most cases positioned opposite each other, a layer of ice growing away from the cooling body is formed on each cooling body. The ice layers of each cooling body grow towards each other until they finally contact each other. When contact has been established the two ice layers freeze together thereby forming a one-piece ice figure. This method achieves a higher working speed than the process according to claim 1, as the ice figure can be formed in one piece.

When the method according to claim 6 is employed the opposing cooling bodies are positioned preferably in the direction of gravitation, arranged in a vertical manner, or positioned in any desired angle to the direction of gravitational pull in the event of special applications.

As far as bringing water into contact with the cooling bodies is concerned it is possible to have the latter swilled with an excess amount of water to be frozen, whereby the water should be propelled by convectional devices. It is also possible to employ conventional aerosol mist and rotational moulding technology for the manufacture of transparent ice figures as described, for example, under DE-PS 37 21 334.

The ice layer being generated grows away from the cooling surface. This causes the gases contained in the water, particularly air, to be retained during the freezing process at the cooling surface or at the ice layer already formed at the front line of the freezing process, i.e. the interface between ice and air where they are removed either by convection or gassing by the air from the liquid/gas/solid state of equilibrium at the front line of the freezing process, so as to form a transparent, or at least a translucent ice figure. The shape of the ice figure is determined by the type cooling surface formation.

The completion of the ice figure is recorded in accordance with the present invention. As required, this can be executed automatically with the of electromechanical, electronic, opto-electrical as well as optical methods, whereby the recording of the conclusion of the figure generates a certain parameter. In its simplest embodiment the parameter is used to trigger an acoustic or visual signal informing manufacturing personnel that the figure has been completed. The only tasks that remain to be performed are those of removing the figure after releasing the cooling bodies from the fixture for the manufacture of ice figures. Therefore the freezing process is basically an automatic one allowing the manufacture of larger numbers of ice figures.

It would also be conceivable to use the parameter recorded for extending automation and/or process control. It would be possible, for example, to initialize a brief warming of the cooling bodies thereby releasing the one-piece ice figure described above from the cooling surfaces of the cooling bodies, after which the one-piece figure is removed manually.

Moreover, it would be possible to automate the manual removal of the one-piece ice figure and to control this process by using the available parameters. In this context, the mounting of the cooling bodies on a type of carriage would suggest itself. After recording the parameter indicating the completion of the figure the carriage would drive out of the water bath and the cooling bodies—after a brief warming interval—would then be swivelled in the direction of an appropriate conveyor belt and subsequently opened wide enough to allow the one-piece ice figure to be released onto the conveyor belt and transported to a refrigerated storage room. After this the cooling bodies return to the desired distance between each other, swivel into place again and are dipped into the water thereby initiating a new freezing process for the manufacture of a one-piece ice figure. These sequences comprise a fully automatic process for the manufacture of one-piece ice figures which achieves a further reduction of manufacturing time and a piece output per time unit suitable for the manufacture of larger lot sizes. The provision allowing a variable positioning of cooling bodies offers the advantage of varying the thickness of the ice layers growing away from the cooling bodies in the region of the contact zones. These contact zones can also be altered by adjusting the individual cooling bodies to generate different refrigeration intensity and/or by setting different cooling periods. Thus it would be possible to pre-freeze the base section of an ice figure to the desired thickness, before the cooling body positioned vertically above and producing the upper section of the ice figure is supplied with refrigerating capacity. By proceeding in this manner it would be possible to produce a sturdy base section capable of carrying the heavy upper sections of ice figures as well as more delicately shaped upper sections.

Moreover, the possibility of varying the distance between the cooling bodies, particularly in the event of concave shaped cooling surfaces, allows a detailed shaping of the contact zone of the ice layers involved due to the fact that the contact zone can be formed with greater precision the closer the two cooling bodies are brought together.

Recording the completion of one-piece ice figures with the help of a sensor and/or an electronic image analyzing system according to claim 8 offers the advantage of determining the time of figure completion using simple measuring technology. The time of completion is recorded and then either reported to operating personnel or initiates an automatic process in which the cooling bodies are briefly warmed so that the formed ice figure is released from the cooling surfaces of the cooling bodies. In the case of two vertically arranged cooling bodies the recorded signal can trigger the removal of the upper cooling body and subsequent transport of the ice figure by a robot. The use of an electronic image analysis system allows remote monitoring of the process, such as locations removed from the actual areas in which the refrigeration processes take place. Another advantage of electronic image analysis consists of feeding visual data concerning the completion of a one-piece figure into a computer which compares the actual contact zones of the ice layers involved with the stored data of known and well tried contact zones. When the actual data of the contact zone of the one-piece ice figure being formed concur with the stored data, the computer terminates the freezing process and initiates further process steps. The use of computer based, image analyzing systems also permit on-screen editing of ice layer contact zones, as well as the simulation of the freezing process on the basis of established data, thus allowing the determination and realization of the optimal properties with regard to freezing periods, the formation of contact zones and the completion of one-piece ice figures. Moreover, the use of a computer allows the continuous recording of the development of an ice figure and timely adjustments of refrigeration intensity in the event of deviations in the desired shape of the respective ice figure.

The provisions of claim 9 stipulating the use of conventional cooling bodies is advantageous insofar as well tried methods, particularly glycol flow techniques, may be employed. If desired, evaporation cooling can be used. Cooling bodies with special shapes or special surfaces, for example with fine engravings, are easy to produce.

The coaxial arrangement of the cooling bodies according to claim 10 yields a symmetrical, one-piece ice figure, for example a goblin or cup out of transparent ice, whereby the upper section consists of a hemispherical ice cup and the lower section of a dome shaped base, for example, and the tangent plane at the vertex of the hemispherical ice cup intersects the longitudinal axis of the base component at a 90° angle. This serves to avoid the production of non-symmetrical ice figures which could arise under unfavorable conditions when an ice figure is assembled which consists of a number of different components joined to together by freezing.

The provision whereby convex cooling surfaces are used offers the advantage of the manufacture of cup shaped ice figures which can be filled with any kind of contents, particularly edible substances.

The use of cooling bodies with concave surfaces offers the advantage that the concave cooling bodies allow an exact shaping and designing of the later outside surface as the exterior surface of an ice figure formed by concave cooling surfaces have the exact same size as the surface of the concave cooling surfaces. Accordingly, the surfaces of the concave cooling surfaces can be provided with fine engraving work which appear as complementary engraving work on the surface of the ice figure to be produced. The refrigerating intensity of any concave or convex cooling-body can be varied by changing the spacing of the cooling coils inside the cooling body so as to ensure an evenly growing freezing front line, even when the shape to be formed by the cooling surfaces of the cooling body displays different thicknesses. The side of the cooling body facing away from the cooling surface should be provided with thermal insulation so that the largest share of the cooling capacity is made available to the cooling surface of the cooling body. With regard to further details concerning the design and arrangement of such cooling surfaces with adjustable cooling capacity we refer on all points to the applicant's German patent application P 39 09 316.6 of Mar. 21, 1989.

Apart from the possibility of producing ice figures with convex figure elements and an engraved convex surface, the use of cooling bodies employing one convex and one concave cooling surface offers the advantage that both surfaces of a cup shaped ice figure can be provided with a special surface treatment and design.

According to claim 11 there are a number of advantageous possibilities of bringing water into contact with the cooling bodies. According to individual requirements certain methods may be opted for, whereby the present invention preferably employs a water bath which the cooling bodies are dipped in to.

The provisions of claim 12 offer the advantage of producing ice figures preferably for the high end gastronomy and catering trade sector which can be used to cool food and beverages and also as decorative elements. The production of ice figures consisting mainly of transparent ice has the advantage of creating particularly attractive decorative elements, whereby ice figures consisting of transparent ice may also contain various kinds of encased items and inclusions.

Particularly with regard to the integration of encased items and inclusions into ice bodies and ice figures we refer on all points to the applicant's patent applications P 39 09 317.4 and P 39 09 318.2 of Mar. 21, 1989.

Claim 13 pertains to a device for executing the process according to claim 1 and claim 14 pertains to a device for the execution of the process in compliance with claim 6.

The claims 15 to 17 are concerned with advantageous further additions to both devices.

The use of concave shaped cooling surfaces permits the manufacture of components and sections of any desired shape.

Thus, for example, a decorative cup or goblin shaped ice figure can be produced whereby the base has the shape of a cup turned over and may consist of opaque ice, while the upper, cup shaped section may be made of transparent ice with one or several inclusions if desired.

An additional possibility consists of encasing stems of flowers in a base of transparent ice while encasing appropriately arranged flowers with shorter stems in the upper section so that the entire figure looks like a bouquet of flowers tied together.

The use of edible encasements or inclusions has the advantage of enhancing foods or beverages contained in such an ice figure in a special manner.

The use of organic encasements or inclusions has the advantage of being more suitable for human consumption than synthetic encasements.

Further advantages and features of the invention will become evident by the following description of an application example and reference to the drawing.

Figure 1:
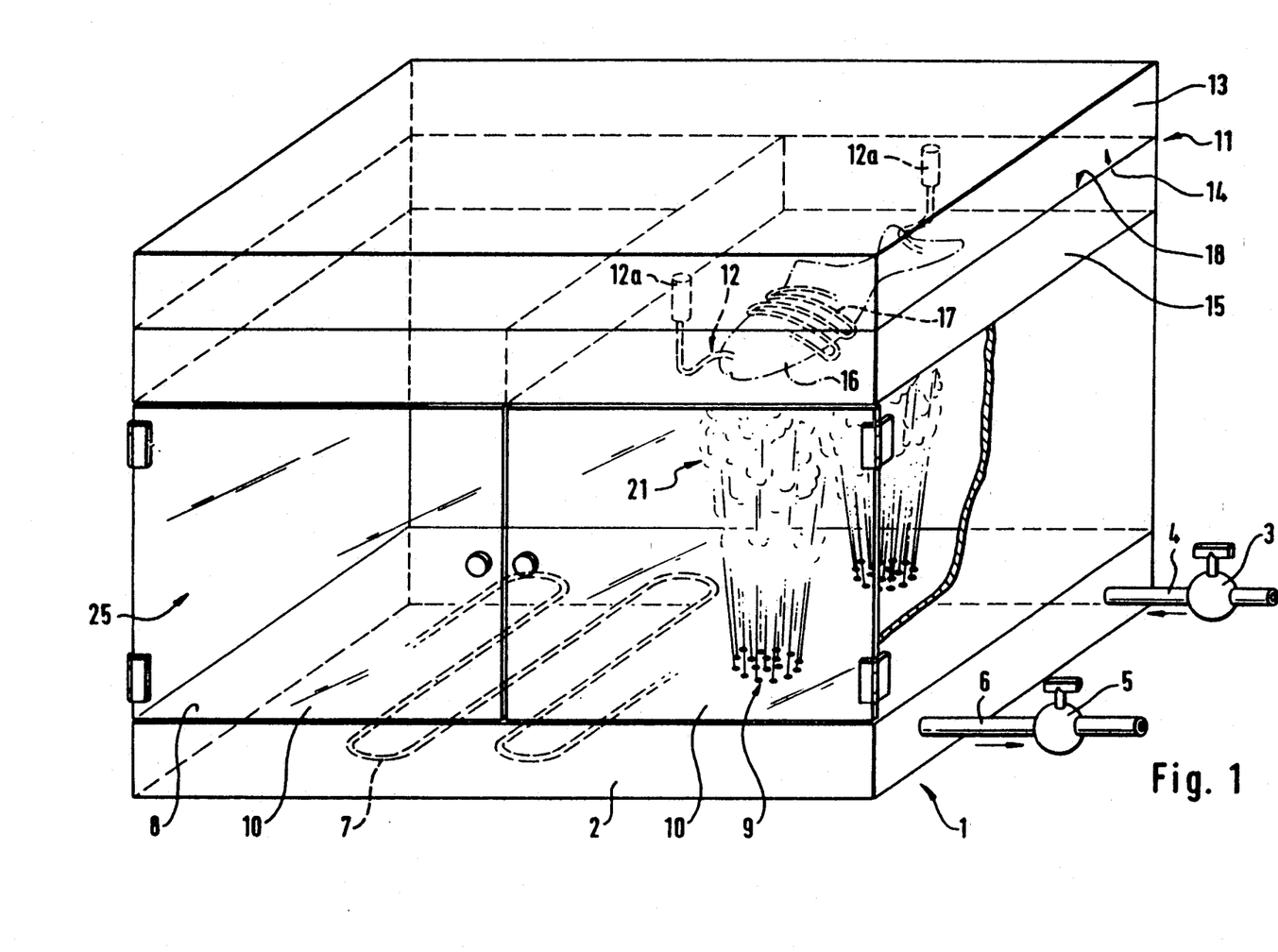
FIG. 1 shows a perspective drawing of a device for implementing the process according to invention.

In FIG. 1 a device for implementing the process according to invention for the production of ice figures is designated by 1. Device 1 which resembles a cabinet and which is thermally insulated with respect to the environment possesses a reservoir 2 for water which is provided with a water feed pipe 4, fitted with a shut-off valve 3, and also with a water outlet pipe 6 which can be closed by means of a valve 5. The reservoir 2 also is fitted internally with evaporator cooling coils 7. In addition nozzles 9 arranged in a spiral configuration are located on the surface 8 of the reservoir 2. Furthermore, the device 1 is closed off to the environment while it is operating by means of transparent doors.

In the upper part 11 of the device 1 a coolant circuit 12 runs, whose connection sleeves only are shown by dotted lines in FIG. 1, and whose coolant is cooled by a conventional evaporator. The coolant circuit 12 is embedded in a block 13 which is composed of good heat-insulating material. On the underside 14 of the block 13, cooling surfaces 16 concave in form are located on the moulding elements 15, where the cooling surfaces 16 have the negative shape of one half of a fish in accordance with FIG. 2. The moulding elements are made of material with good heat conducting properties and ar provided internally with cooling coils 17. The cooling coils 17 with their inlet 17a and their outlet 17b are looped into the coolant circuit 12 of the block 13. At those points where increased cooling is required the number of turns of the cooling coils 17 per unit of volume or per unit of surface area is higher than at those points or areas where less cooling is required. The moulding elements are installed with their rear side 18 of the cooling surface 16 placed at the underside 14 of the block 13 in such a way that the underside 14 of the block 13 and the upper side 18 of the moulding units 15 lie flush against one another. The moulding units 15 are designed in such a way that they can if required be quickly and simply exchanged.

Figure 2:
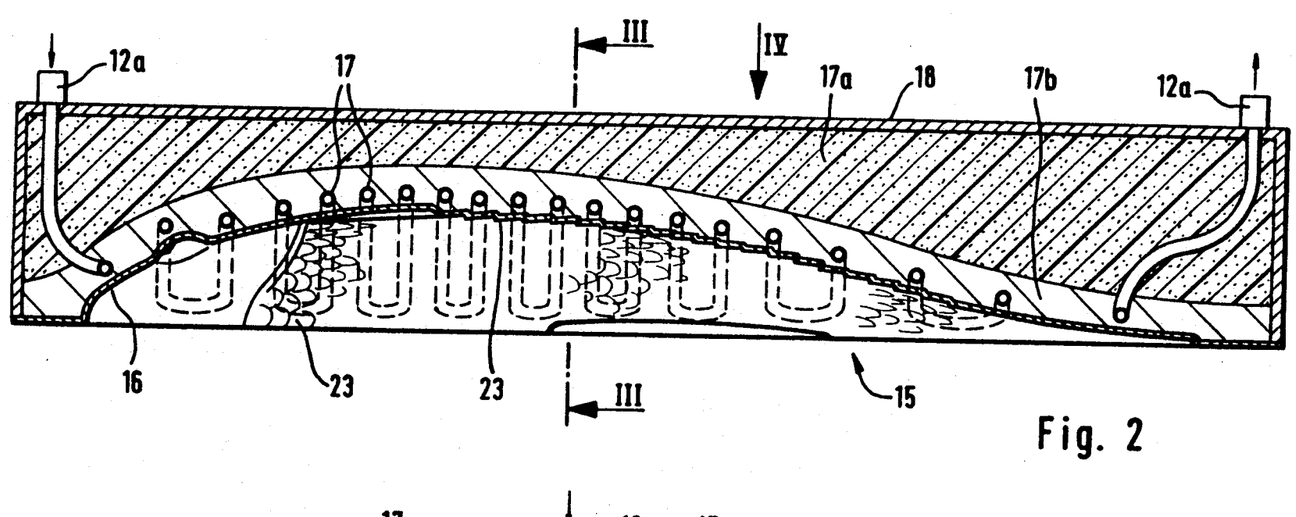
FIG. 2 shows a longitudinal section of a cooling surface formed at a moulding element.
Figure 3:
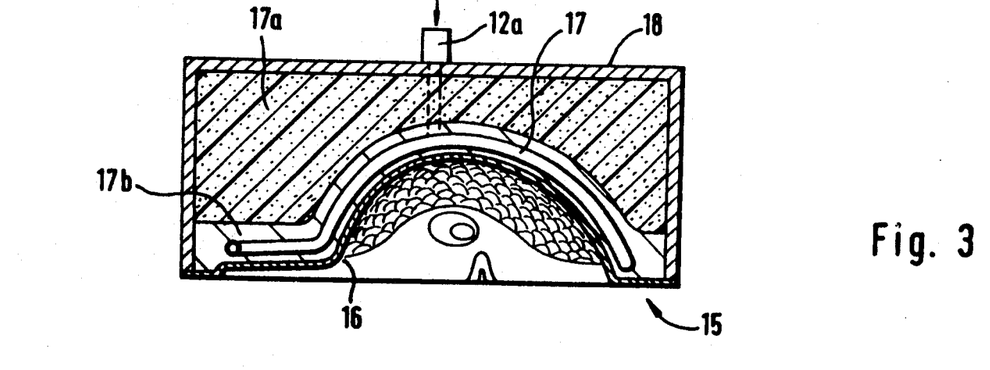
FIG. 3 shows a section along the line III—III in FIG. 2.

In order to produce a component 19 of an ice figure the water in the reservoir 2 is maintained at the constant temperature of +0.7° C. and atomized by means of the nozzles 9, which are arranged in a spiral configuration, in such a way that the water mists 21 are continually brought into contact with the cooling surfaces 16 which form the shape and the mists solidify on these cooling surfaces 16 into ice and the layer of ice thus forming grows away from the cooling surface 16. Transparent ice is formed by this process because during the freezing process at the cooling surfaces 16 the water has the tendency to collect gas inclusions, particularly air inclusions at the phase boundary between ice and air, with the result that air which may be escaping from the water by cooling gathers at the phase boundary area or is able to escape there. reached the thickness desired, the spraying process is discontinued and the moulding elements heated by a brief heating of the cooling coils 17 so that component 19 melts slightly at the surface 22 which faces the cooling surfaces 16 and thereby separates from the finely-chased cooling surfaces 16. The brief heating of the cooling coils 17 improves the surface 22 of the component 19 since no parts of the component 19 remain attached to the cooling surfaces 16 which means that under routine production no reworking of the surface 22 of the component 19 is required.

Figures 4, 5:
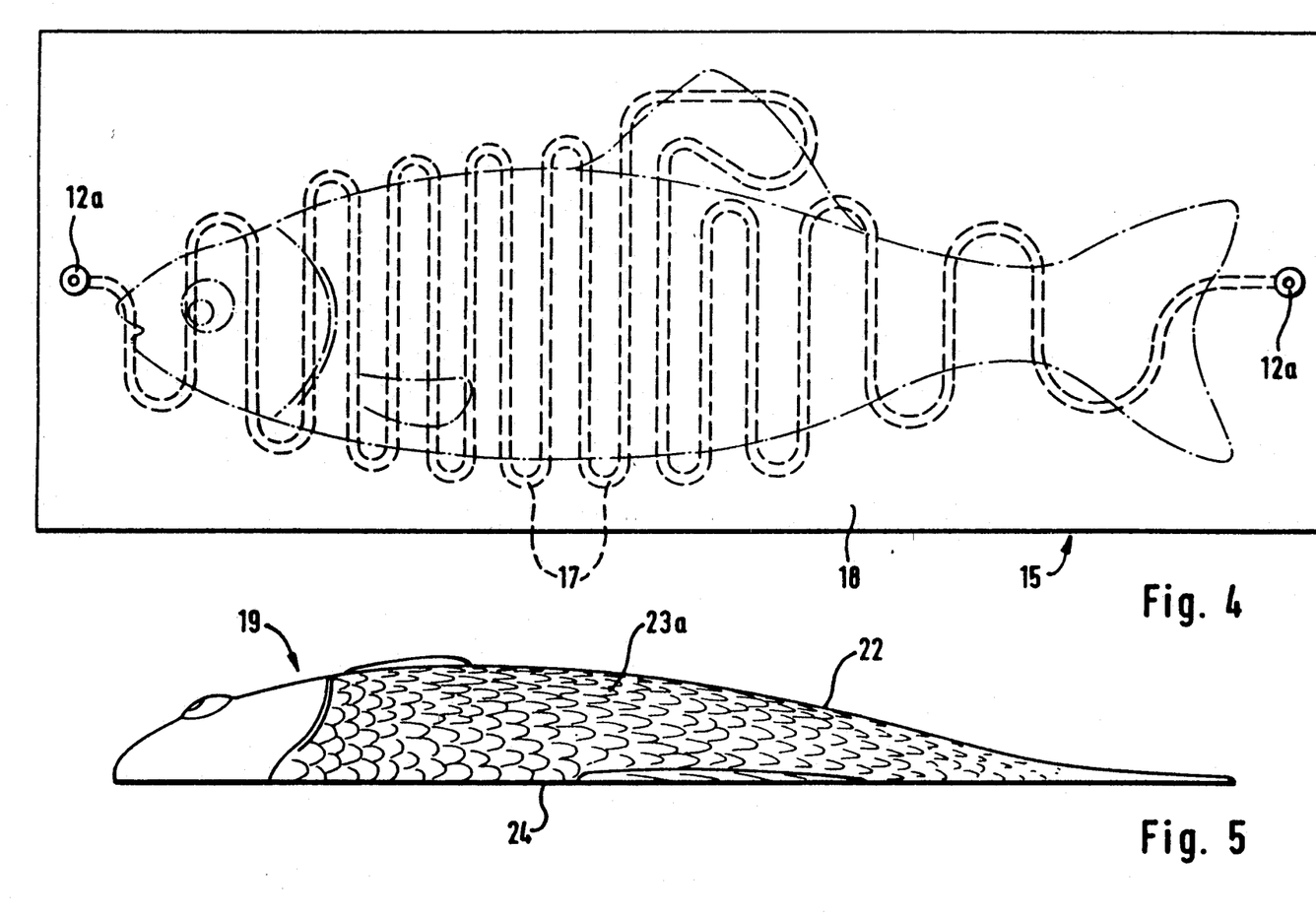
FIG. 4 shows a top view of the moulding element corresponding to FIG. 2 in the direction of Arrow IV in that figure.
FIG. 5 shows a side view of one component of an ice figure which is formed in a cooling surface as shown in FIG. 2.

FIG. 5 shows such a component 19 with fine chasing of the surface 23a corresponding to the chasing 23 of the cooling surface 16 for an ice figure 20. Two such components 19 of an ice figure 20 are melted flat at their exposed lower surfaces 24, for example on a hotplate, and then their exposed surfaces 24 which have become wet through melting are brought together to produce a single ice figure when the two components 19 which have been brought together are re-cooled below the freezing point of water.

Figure 6:
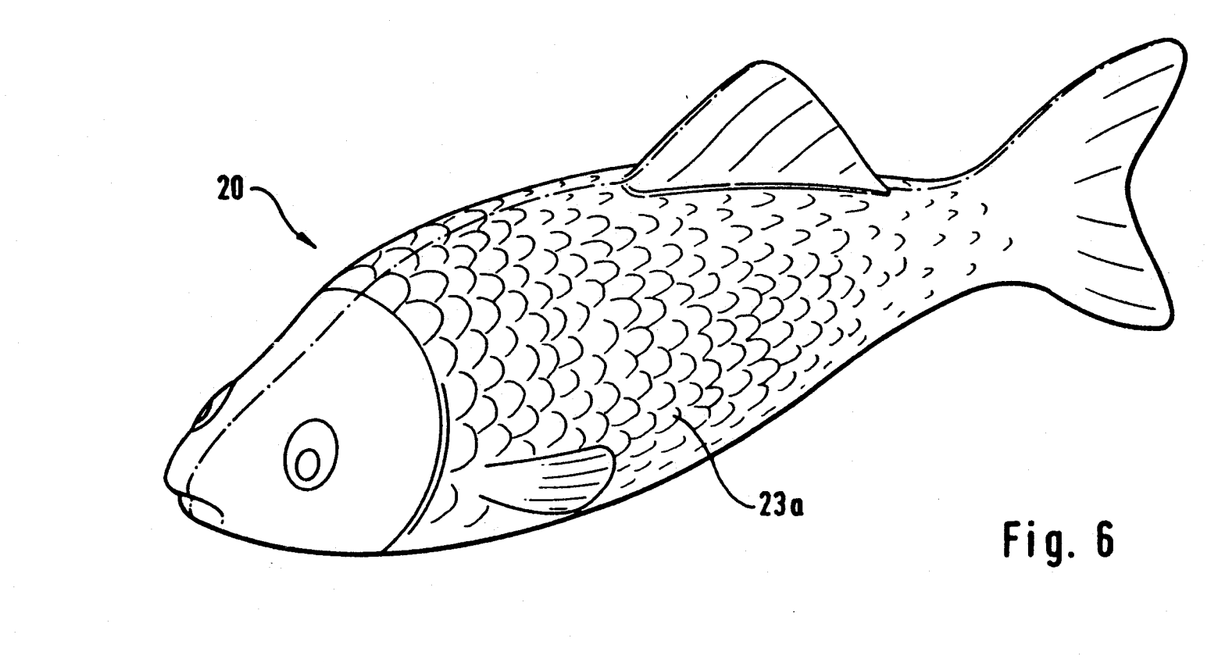
FIG. 6 shows a perspective drawing of a single ice figure which is produced when two components as shown in FIG. 5 are joined together.

Such a single-piece ice figure, here as an example the representation of a fish in transparent ice, is shown in FIG. 6.

Since different cooling intensities are required in the production of the complex shapes of the component 19 of an ice figure on account of the various depths of the negative shape of component 19 in the cooling surface 16, the cooling intensity has a variable setting. This can result from, on the one hand, different areas within the moulding element being equipped with different numbers of cooling coils 17 or, on the other hand, from cooling coils 17 being used which are controlled separately and are connected to different coolant circuits.

The temperature of the whole cooling space including the form-shaping concave cooling surfaces 16 typically begins to fall at a temperature within the coolant circuit 12 of −10° C. and during the course of the freezing process is brought down to a minimum of −40° C. The temperature gradient which falls with time can be controlled either manually or preferably electronically.

In order to improve still further the evenness of filling of the moulding element 15 at places with different depths, the spraying power of the nozzles 9 can also be varied. If required, nozzles 9 of different design or arranged differently can be employed in the surface 8 of the reservoir 2.

As a rule a number of moulding elements 15 are fitted to the underside 14 of the block 13 so that multiple components 19 of, depending on the circumstances, different ice FIGS. 20 can be produced in one operating cycle. In order to avoid a layer of ice forming between the cooling surfaces the spaces which may be present between the moulding elements 15 can be covered with pieces of plastic which are not shown in the drawing.

If components are to be produced which have undercuts then split moulding elements are used whose sections can be removed separately so that the components which have been formed at the cooling surfaces, which are also divided, can be easily removed from the mould despite the undercuts. In the case of this moulding element the cooling coils 17 are of course to be arranged in such a way that each section of the moulding element is provided with its own coolant supply.

Even when the moulding element 15 is divided the individual sections of the moulding element, depending on their cooling requirements, can be cooled by a different number of turns of the cooling coils per unit of volume or per unit of surface area.

Using this process according to invention, any shapes desired, whether they be animal shapes, ice vases, ice cubes and so on, can be produced, preferably of transparent ice.

Furthermore the possibility exists of using component 19 on its own as a decorative object, as for example in an arrangement on a plate or a tray on a festively decorated table, with its surfaces 24 melted flat.

Figure 7:
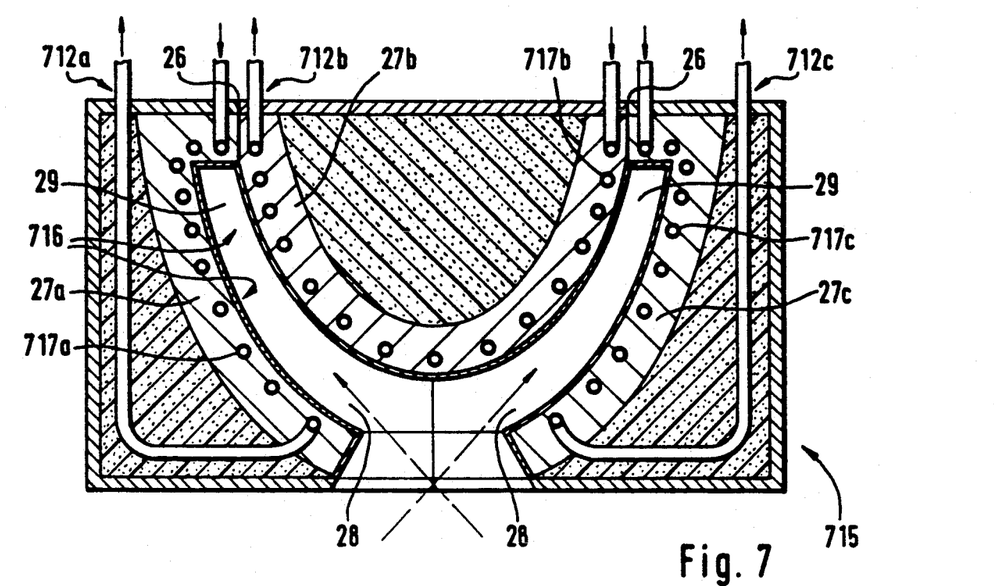
FIG. 7 shows a longitudinal section of a moulding element for making cup-shaped components.

A moulding element, which separates at locations 26, is designated with 715 in FIG. 7. All reference numbers which are not explained in more detail in the following text should be taken to have the same meaning in FIG. 7 as in the design forms described above.

The moulding element shown in FIG. 7 is cooled by means of three independent coolant circuits 712a, 712b, 712c. In order to achieve the aims intended, the internal spaces 27a, 27b, 27c of the moulding element 715 are filled out with injected foam so that the cooling intensity supplied is for the most part applied within the area of cooling surface 716.

Admission of water is effected in the direction shown by the dashed arrows in FIG. 7. In order to prevent any premature freezing of the water admitted in the aperture region 28 of the cooling surface 716, the density of the cooling coils 716a, 717b, 717c increases in the rearward area 29 of the cooling surface 716.

After one of the components corresponding to moulding element 715 has frozen completely in the form of a cup the moulding element 715 is heated by means of coolant circuits 712a, 712b, 712c to some degrees above 0° C., so that a small meltwater gap appears at the cooling surface 716 and thus causes the component of an ice figure corresponding to moulding element 715 to detach itself from the cooling surface 716.

Since this component of an ice figure formed within moulding element 715 exhibits undercuts, the moulding element 715 must be taken apart at the points 26 provided for this so that the component formed within the moulding element 715 can be removed from the mould.

Cup-shaped components of an ice figure which are formed in this way exhibit at the surface which abuts onto the cooling surface 716 precise conformity to the dimensions and finish of the cooling surfaces 716.

The cup-shaped components formed using the moulding element 715 can be melted flat at their lower end, brought together and then cooled to below the freezing point of water in order to make a goblet-shaped ice figure with one cup-shaped component being turned upside down and functioning as the foot of the goblet-formed ice figure and the other cup-shaped component forming the upper part.

Here the cup-shaped ice pieces need not be melted on a hotplate over a whole surface but the surface could be formed for example in the shape of a ring, especially when peg-and-hole connections between the two components are provided for mechanical stabilization. As a rule, however, such a peg-and-hole connection is not necessary since adequate bonding can be achieved without mechanical anchoring.

Figure 8:
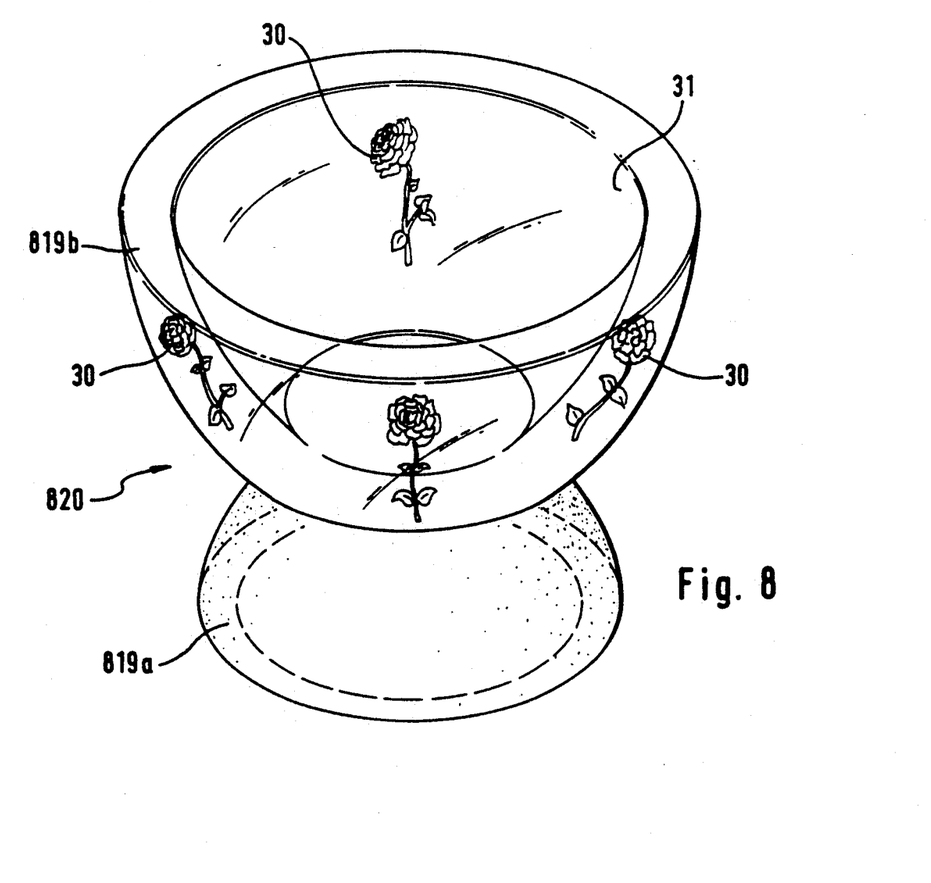
FIG. 8 shows a goblet-shaped ice figure.

The ice figure 820 thus formed of the two components in accordance with FIG. 8 has an upper component 819b of transparent ice within which encased objects 30, in this design example roses, are arranged, and which has a lower cup-shaped component 819a which is made of opaque ice.

Such cup-shaped components 819a, 819b are produced as a rule by immersion in water with the aid of conventional cooling bodies on a glycol basis which have convex cooling surfaces, although they can also be produced using the rapid spray and spin process.

This process is therefore especially suited to producing cup-shaped components 819a, 819b, for the reason that it is especially easy with this process to produce transparent or opaque ice; for when the water is moved which washes against the convex cooling surface an ice layer of transparent ice is formed which grows away from the cooling surface, and this is due to gas inclusions in the water increasing at the phase boundary between ice and water and being continually removed from the phase boundary surface by convection. If on the other hand opaque ice is desired, then the water in which the cooling body with the convex cooling surface is immersed needs only not to be moved, and in this way the gas inclusions cannot be removed from the freezing face and an opaque, white-looking ice is formed.

The encased objects 30 within the cup-shaped component 819b are so encased by, in the case of this example, a glycol-cooled cooling body being immersed in water and after a determined time being lifted out of the water with the cooling process continuing, this causing the ice layer which has already formed to dry off; at this point an object for encasement, in this case a rose, is wetted by the operator with a bonding agent, in this case water, and stuck to the surface of the ice layer which has been considerably cooled down. The cooling body together with the ice layer adhering to it and with the item for encasement stuck to that is lowered back into the water bath. The water here needs to be moved for transparent ice to form, and after a certain time, when the desired thickness has been reached of the wall of the cup-shaped component 819b, the cooling body with the component 819b adhering to it and now containing the encased objects 30 is lifted out of the water. The cooling body is then heated to a few degrees above zero in order that the inner surface 31 of the component 819b melts slightly and a meltwater gap forms between the cooling surface of the cooling body and the component 819b. As soon as air is drawn into this meltwater gap due to the dead weight of the component 819b, the component 819b can be removed manually from the cooling body or ejected automatically by means of an ejection device suitable for this purpose.

The inner surface 31 of the component 819b always conforms to the exact dimensions of the cooling surface of the cooling body used.

Graduations which run all the way around the components, continuously or discontinuously, can also be produced on components 819b such as these which are produced by means of cooling bodies; this is achieved by the evaporator cooling rod with the component adhering to it being only partially withdrawn from the water and further ice being deposited on the part which still remains in the water, this thus forming a graduation in thickness which runs right around it, continuously or discontinuously.

Of course graduations, for decorative or stylistic reasons as desired, produced in this way can be made, depending on what is wanted, of transparent ice or of opaque ice irrespective of the kind of ice of which the rest of the component has been made.

Ice FIGS. 20, 820 produced in this way can be manufactured in large series, since for example the freezing time for a moulding element 15, 715 with a four liter capacity amounts to approximately 25 minutes per component 19, 819a, 819b.

In addition, the freezing process can be halted or corrected at any time and at any phase. During a period of interruption to the freezing process for example objects for encasement, such as flowers, seafood and so on, or also pre-frozen arrangements of such objects for encasement, can be placed into the components 19, 819a, 819b of an ice FIG. 20, these objects having been wetted with water as a bonding agent; this is provided that the freezing process is then continued until the components 19, 819a, 819b are completely formed.

As regards the kind of encased objects as well as the various possibilities which exist for placing objects for encasement within an ice figure 20, 820 made of transparent ice or transparent and opaque ice, reference can be made to the full contents of patent applications of the same applicant with the same date of application with the lawyers' file numbers P 38 09 318.2 and P 39 09 317.4.

If the fine surface chasings 23a of the ice figure be inadequate then no difficulties are presented by finishing them with the most varied tools which are usual in ice-sculpting, possibly with a piece of equipment similar to a soldering iron. With the aid of such a tool surface chasing can be applied even to the smooth surfaces of components 19, 819a, 819b. In particular, such surface chasing work can be also applied to the upper edges of the components 19, 819a, 819b.

Figure 9:
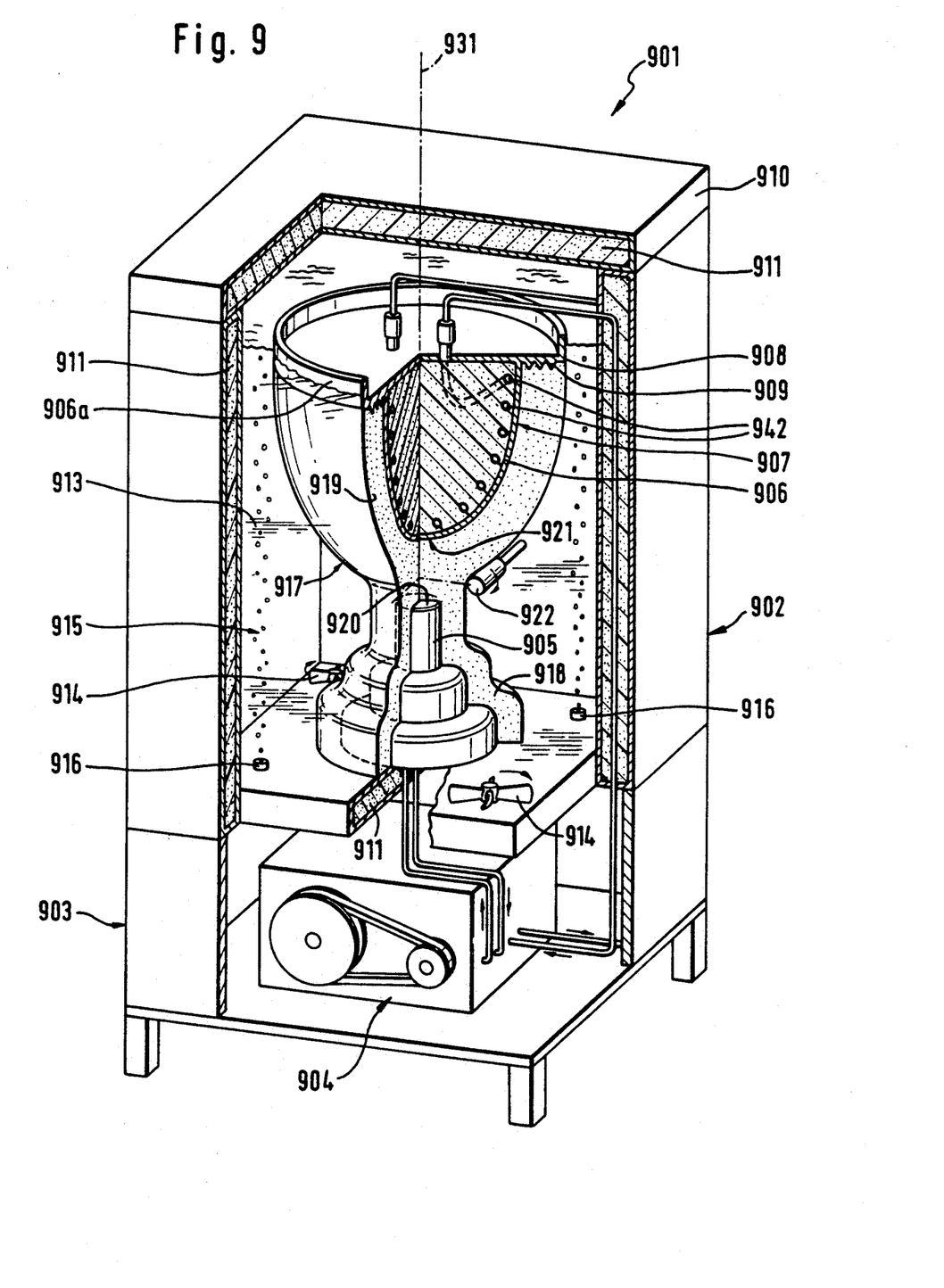
FIG. 9 shows a perspective drawing of a device for implementing a process according to invention with a vertical coaxial arrangement of the cooling bodies.

In FIG. 9 a device for producing single-piece ice figures is denoted by 901. The device includes a container 902 with a built-in refrigeration compressor 904 in its lower part 903. The refrigeration compressor 904 supplies the cooling bodies 905 and 906, which are positioned in a vertical coaxial arrangement, with coolant, in order that the cooling bodies are cooled down to a temperature which lies below the freezing point of water.

The upper cooling body 906 is provided in its upper part 907 with an inner flange 908 which runs all the way round the body and which is connected with the cooling body 906 so as to conduct heat and which features annular projections triangular in cross-section and which run all the way round the flange.

The container 902 has a lid 910 which thermically shields the container 902 from the environment. For this the lid 910 as well as the other walls of the container 902 are provided with an insulating layer 911.

In order to produce a single-piece ice figure 912 in the form of a goblet the container 902 is filled with water 913 in such a way that the cooling body 905 is completely covered with water but the cooling body 906 is not covered with water 913 over its rim 906a. The water 913 is kept moving within the container 902 by for example propeller agitators 914 and/or suffused with bubbles by means of air streams 915 which come from the air streamers 916. In the event that only bubble suffusion is employed then naturally a multiplicity of air streamers 916 is necessary. Moving and suffusing the water 913 with air 915 has the object of removing gas inclusions, especially air inclusions and other impurities which collect at both the developing freezing face as well as the ice/water phase boundary 917, from the ice/water equilibrium of the phase boundary 917, so that the ice is preponderantly transparent, or at least is translucent.

During the course of formation of ice layers 918 and 919 around the cooling bodies 905 and 906 these layers grow away from the cooling surfaces 921 and from the cooling bodies 905 and 906 and thus towards one another until they make contact with one another, whereupon they freeze together and thus form a single-piece ice figure 912.

The instant at which the single-piece ice figure 912 is completed is passed on by a sensor 922 to electronic signals processing equipment which is not described in any further detail here, and this equipment reports to the operating personnel by means of an acoustic signal the time at which the single-piece ice figure 912 has been completed.

The sensor consists of a rotating roller 922 with a defined speed and which is positioned at a predetermined location corresponding to the thickness of ice there desired and whose rotation is impeded when both ice layers 918 and 919 come into contact with one another or freeze together.

In addition, if required, the cooling intensity of the upper cooling body 906 can be regulated independently of the cooling intensity which is applied to the lower cooling body 905.

Since the cooling bodies 905 and 906 are arranged vertically and coaxially with respect to a vertical axis 931 the single-piece ice figure 912 will be formed at least approximately rotationally symmetrical with respect to the axis 931.

When the freezing process has ended, the cooling bodies 905 and 906 are briefly heated so that the single-piece ice figure 912 detaches from the cooling surfaces 920 and 921 of the cooling bodies 905 and 906. The upper cooling body 906 is then removed in an upward direction, whereupon the single-piece ice figure 912 is removed from the lower cooling body 905.

Figure 10:
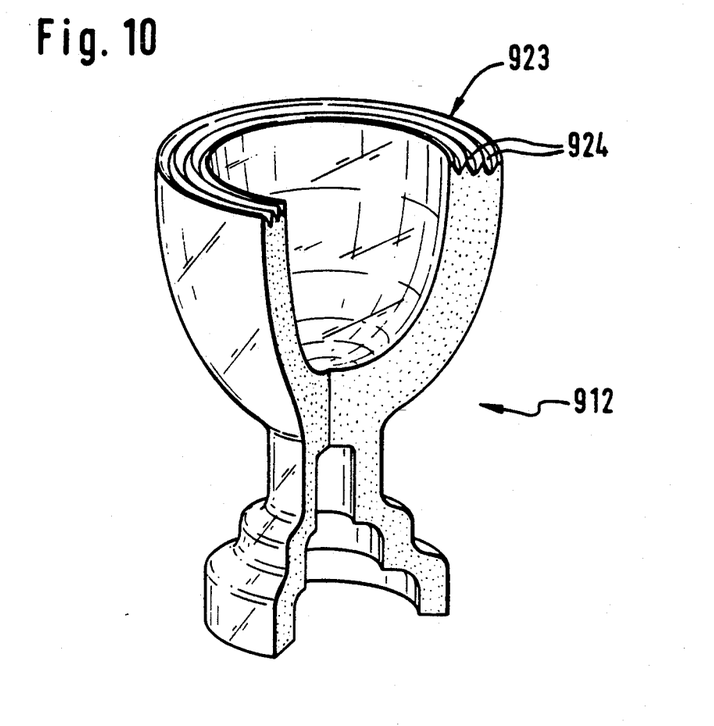
FIG. 10 shows a perspective drawing of a single-piece ice figure produced in the device according to invention shown in FIG. 1.

The single-piece ice figure 912 as shown in FIG. 10 which is then made available exhibits grooves 924 on its upper rim 923 which complement the annular projections 909 with triangular cross-section of the cooling body 906.

Such a single-piece ice figure 912 can be used in the field of sophisticated gastronomy for cooling foods and/or drinks.

Moreover objects of any type desired can be encased within the single-piece ice figure 912 by interrupting the freezing process once a first ice layer has formed and placing these objects for encasement upon the surface of the ice layer which has first formed and then these objects being enclosed within the single-piece ice figure through the continuation of the freezing process. In this connection attention is drawn by way of introduction to the patent applications of the same applicant P 39 09 318.2, P 39 09 317.4 and P 39 09 316.6 of the Mar. 21, 1989.

Figure 11:
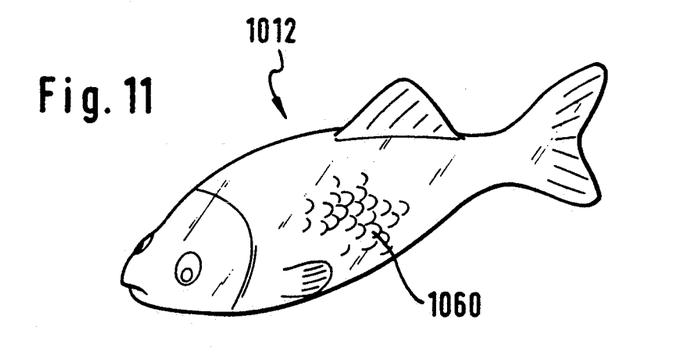
FIG. 11 shows a perspective drawing of a device according to invention with a horizontal coaxial arrangement of the cooling bodies.
Figure 12:
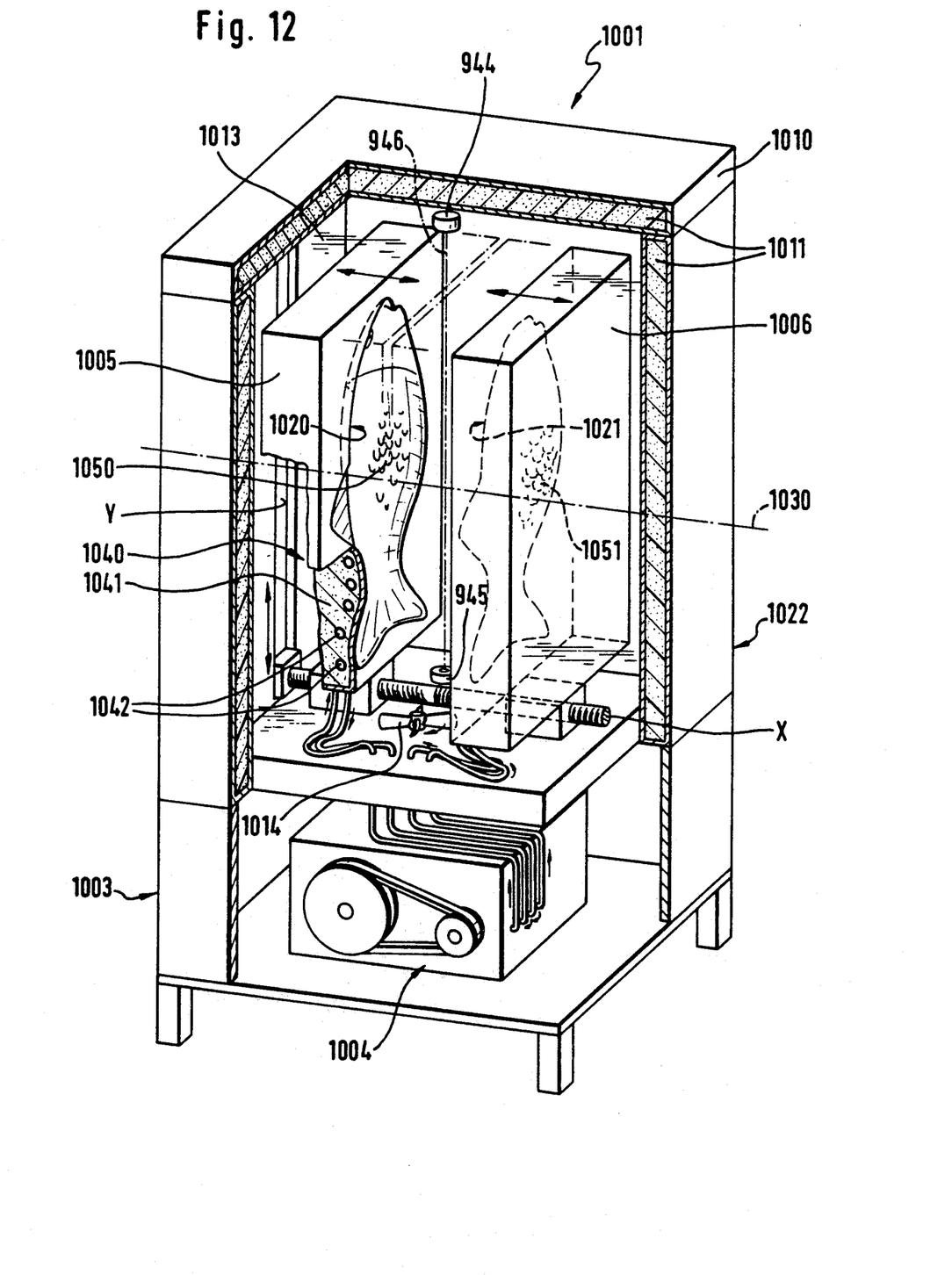
FIG. 12 shows a perspective drawing of a single-piece ice figure produced in a device according to invention shown in FIG. 11.

FIG. 11 shows an example of a design using a device 1001, where in the following description the corresponding components are designated with the same reference numbers as in the design example as in FIG. 9, but each number is raised by 100, and explanations are only repeated if there are variations from FIG. 9 which require explanation. In the design as shown in FIG. 11 the cooling bodies 1005 and 1006 are arranged horizontally and coaxially along an axis 1030. The cooling surfaces 1001 and 1021 of the cooling bodies 1005 and 1006 which take the shape of a hollow mould have a concave shape in the design example shown in FIG. 11 and in each case have the form of one half of a fish. Moreover the cooling bodies 1005 and 1006 take the form of moulding elements whose interior space 1070 can for the purposes intended be filled out with foamed-in heat-insulating material 1041, so that the cooling intensity supplied is applied preponderantly to the area of the cooling surfaces 1001 and 1021. In addition, the moulding elements are provided with cooling coils 1042 in their interior 1040 which may exhibit a different number of turns per unit of volume or per unit of surface area depending on their cooling requirements. This thus ensures that the water 1013 at the cooling surfaces 1001 and 1021 in one of the side walls of the container 1002 freezes on a virtually parallel front, so that two essentially parallel faces, which are vertical with respect to the axis 1030 and which grow towards one another along the axis 1030, finally touch one another between the two cooling surfaces 1005 and 1006, with the result that a single-piece ice figure 1012, in the case of this example in the form of a fish, is formed. Here attempts should be made to achieve a slightly convex or bumpy exposed surface in order to ensure that the faces continue to grow together from inside to outside and that water inclusions with impurities are excluded form the contact area.

Completion of the single-piece ice figure 1012 formed can in this case be detected for example by opto-electronic components 944, 945. Here an optical transmitter 944 emits light along an axis 946 which stands vertically with respect to the horizontal axis 1030 and which is situated on the plane of the cooling bodies 1005 and 1006, and this light is received by the optical receiver 945 and conducted to an electronic evaluation unit which is not described here in any further detail. When the ice region of the left cooling surface 1020 in FIG. 11 and the ice region of the right cooling surface 1021 in FIG. 11 meet on this plane this interferes with the light path in this area, this interference is detected by the evaluation device, which in turn after a certain time delay sends a signal which is either an acoustic signal for the operating personnel or one which can be used for further automatic process control. Thus, for example, the evaluation equipment can fill the cooling coils 942 briefly with a heating medium so that the single-piece ice figure 1012 detaches from the cooling surfaces 1020 and 1021 and can then be removed.

As may be appropriate for the purposes intended the cooling bodies 1005 and 1006 are attached to a movable X-Y rod assembly in order that the separation of cooling bodies 1005 and 1006 from one another can be set to a defined value on the one hand, and on the other so that the ice figure can be moved out in the Y direction using the rods assembly, so that when the cooling bodies 1005 and 1006 are shifted away from each other the single-piece ice figure 1012 can be removed comfortably.

The advantage of using concave cooling surfaces 1020 and 1021 lies in the fact that the cooling surfaces 1020 and 1021 exhibit fine surface chasing 1050 and 1051 which is transferred almost exactly onto the surface of the single-piece ice figure 1012, which means that it is possible with the use of cooling bodies 1005 and 1006, which possess concave cooling surfaces 1020 and 1021, to obtain a single-piece ice figure 1021 with a very high surface quality and, if applicable, with surface chasing 1060, and this in turn means that subsequent reworking of the surface of the single-piece ice figure 1012 is as a rule not required.

For further details concerning such cooling bodies 1005 and 1006 with concave cooling surfaces 1020 and 1021, attention is drawn by way of introduction to the German patent application of the applicant P 39 09 316.6 of the Mar. 21, 1989.

If, as a result of increased cooling applied to this area, a swelling should form in the contact zone of the ice layers which have grown together then this can be reworked quickly and without further ado with the aid of, for example, a tool similar to a soldering iron.

Both this horizontal arrangement of the cooling bodies and the vertical arrangement can be employed in the series production of relatively large quantities of complex single-piece ice figure 1012.

What may also be considered is the use of a combination of vertical with horizontal arrangements of the cooling bodies and/or, with regard to the direction of gravity, a diagonal arrangement.

As the above description shows, the processes according to invention for the production of ice figures are characterized by enabling any ice figures desired, both in transparent ice as well as in a combination of transparent and opaque ice, with—if desired—objects of any type so wished encased in the ice, to be produced in greater runs than has been previously possible and this very rapidly, dependably, inexpensively and without any artistic talent required.

I claim:

1. A process for producing decorative ice figures comprising:
   forming at least two ice figure components on a cooling surface by bringing a flow of excess water into contact with the cooling surface which is cooled below freezing such that the ice grows away from the cooling surface and the unfrozen portion of said excess water being permitted to flow away from said cooling surface;
   separating the components from the cooling surface;
   melting a surface of each component flat;
   joining the melted surfaces; and
   freezing the joined surfaces to form a single ice figure.

2. The process of claim 1 including dividing the cooling surface into at least two cooling surfaces, forming each component on a different one of the divided cooling surfaces, forming a surface of each said component with surface elements so that the single figure has surface elements on opposite surfaces and forming a recess in each component.

3. The process of claim 1 wherein at least one of said components has local variations which require different corresponding local cooling power during said forming, said process including setting said local cooling power for the forming of said at least one component according to said local variations.

4. The process of claim 1 including heating said cooling surface after said forming and removing the components from the heated cooling surface after said heating.

5. The process of claim 1 including interrupting the forming of at least one of said components by interrupting the bringing of excess water into contact with the at least one component during its formation, drying the component thus formed by continued cooling of this component, attaching an object to be encased to the dried component and then bringing excess water into contact with this component to complete the forming of said at least one component to thereby encase the object in the formed at least one component.

6. The process of claim 1 including contacting said cooling surfaces by at least one of immersion in and spraying with water.

7. The process of claim 1 including forming said components preponderantly in the form of at least one of a decorative and utilitarian object equivalent to a glass formed object.

8. A process for producing decorative ice figures comprising:
   forming at least two ice figure components on at least one cooling surface by bringing a flow of excess water into contact with the at least one cooling surface which is cooled below freezing such that the ice grows away from the cooling surface and the unfrozen portion of said excess water being permitted to flow away from said cooling surface; and
   joining the at least two ice figures to form a single ice figure.

9. The process of claim 8 wherein a surface of each component is melted and said joining includes melting a surface of each component, contacting said melted surfaces and freezing said contacted surfaces.

10. The process of claim 8 wherein said process includes forming two opposing components in spaced relation such that the ice of each component grows toward the other component, said forming including growing the two components until they form a single ice figure, and detecting when the single ice figure is formed.

11. The process of claim 8 wherein at least one of said components has different thicknesses requiring different local cooling intensities for corresponding different portions of that component, said process including setting the local cooling intensities so as to compensate for said different thicknesses.

* * * * *